US012451048B2

(12) United States Patent
Lin et al.

(10) Patent No.: US 12,451,048 B2
(45) Date of Patent: Oct. 21, 2025

(54) DISPLAY DEVICE

(71) Applicant: AUO Corporation, Hsinchu (TW)

(72) Inventors: Chih-Lung Lin, Hsinchu (TW); Yi-Jui Chen, Hsinchu (TW); Sung-Chun Chen, Hsinchu (TW); Ming-Yang Deng, Hsinchu (TW); Chia-Tien Peng, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/820,366

(22) Filed: Aug. 30, 2024

(65) Prior Publication Data

US 2025/0111818 A1 Apr. 3, 2025

(30) Foreign Application Priority Data

Sep. 28, 2023 (TW) ................................ 112137569

(51) Int. Cl.
*G09G 3/20* (2006.01)

(52) U.S. Cl.
CPC ....... *G09G 3/2092* (2013.01); *G09G 2310/08* (2013.01); *G09G 2320/0233* (2013.01); *G09G 2330/023* (2013.01)

(58) Field of Classification Search
None
See application file for complete search history.

(56) References Cited

U.S. PATENT DOCUMENTS

| | | | | |
|---|---|---|---|---|
| 11,961,822 | B2 * | 4/2024 | Kim | H01L 25/167 |
| 2023/0104084 | A1 | 4/2023 | Yang et al. | |
| 2024/0029630 | A1 | 1/2024 | Lin et al. | |
| 2024/0257723 | A1 * | 8/2024 | Kim | G09G 3/3233 |
| 2025/0037659 | A1 * | 1/2025 | Xu | G09G 3/3208 |

FOREIGN PATENT DOCUMENTS

| | | | |
|---|---|---|---|
| CN | 111477164 | B | 4/2022 |
| CN | 114783352 | A | 7/2022 |
| TW | 202416256 | A | 4/2024 |

* cited by examiner

*Primary Examiner* — Christopher J Kohlman
(74) *Attorney, Agent, or Firm* — WPAT, PC

(57) ABSTRACT

A display device includes an emission circuit, a first control circuit and a second control circuit. The emission circuit is coupled to a first node and is configured to emit light based on an emission signal and a voltage level of the first node. The first control circuit is configured to charge the first node based on a sweep signal and the emission signal. The second control circuit is configured to discharge the first node based on the sweep signal and the emission signal.

15 Claims, 4 Drawing Sheets

200

DISPLAY DEVICE

CROSS-REFERENCE TO RELATED APPLICATION

This application claims priority to Taiwan Application Serial Number 112137569, filed Sep. 28, 2023, which is herein incorporated by reference in its entirety.

BACKGROUND

Field of Invention

The present disclosure is associated with display technology that is particular about a display device.

Description of Related Art

To achieve the high uniform brightness, the display device adopts the structure of the multi-emission to perform the light emission and the grey scale modulation, and the display device solves the problem of the threshold voltage variation of the thin-film transistors (TFT) and the problem of the power voltage drop (the voltage drop when the current flows through the resistor) by self-compensation. However, to ensure that the TFT can operate in the saturated region, the required power voltage increases and current rise and fall times are longer, resulting in the increased power consumption of the display device and the inability to maintain at the high light emitting efficiency point. Thus, how to design to solve the above problems is an important issue in this field.

SUMMARY

The invention provides a display device that includes an emission circuit, a first control circuit, and a second control circuit. The emission circuit is coupled to a first node and configured to emit light based on an emission signal and a voltage level of the first node. The first control circuit is configured to charge the first node based on a sweep signal and the emission signal. The second control circuit is configured to discharge the first node based on the sweep signal and the emission signal.

The invention provides a display device that comprises an emission circuit, a first switch, a first capacitor, a second switch, a third switch, and a second capacitor. The emission circuit is configured to emit light based on a voltage level of a first node. A first terminal of the first switch is coupled to the first node. A first terminal of the first capacitor is coupled to a control terminal of the first switch. A second terminal of the first capacitor is configured to receive a sweep signal. A first terminal of the second switch is coupled to the first node. A first terminal of the third switch is coupled to a second terminal of the second switch. A first terminal of the second capacitor is coupled to a control terminal of the third switch. A second terminal of the second capacitor is configured to receive the sweep signal.

DETAILED DESCRIPTION

It should be understood that, in this document and the following claims, when an element is referred to as being "connected" or "coupled", it can be "electrical connected" or "electrical coupled". "Connected" or "coupled" can also be used to indicate the operation or interaction of two or more components in conjunction with each other. Moreover, the terms "first" and "second" are to describe the various elements. However, these elements should not be limited by these terms. These terms are used to distinguish one element from another. Unless the context clearly indicates otherwise, the term does not specifically refer to or imply order or precedence, nor is it intended to limit the present disclosure.

It should be understood that, in this document and the following claims, unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terms used herein are for the purpose of describing particular embodiments and are not limiting. As used herein, the singular forms "one", "a", and "the" are intended to include the plural form, including "at least one" unless the context clearly indicates otherwise. The word "or" denotes "and/or". As used herein, the term "and/or" includes any and all combinations of one or more of the associated listed items. It should also be understood that when used herein, the terms "including" and/or "comprising" designate the presence of and/or parts of the described features, areas, integrals, steps, operations, components, but do not preclude the presence or addition of one or more other features, areas integrals, steps, operations, components, parts, and/or combinations thereof.

The following is figures of the multiple embodiments of the present disclosure, and for the sake of clarity, many of the practical details are described in the following narrative. However, it should be understood that these practical details should not be used to limit the case. That is, they are not necessary for the implementation of some of the content of this disclosure. In addition, for the sake of simplicity, some commonly known structures and components are shown in the figures in a simple schematic manner.

Figure 1:
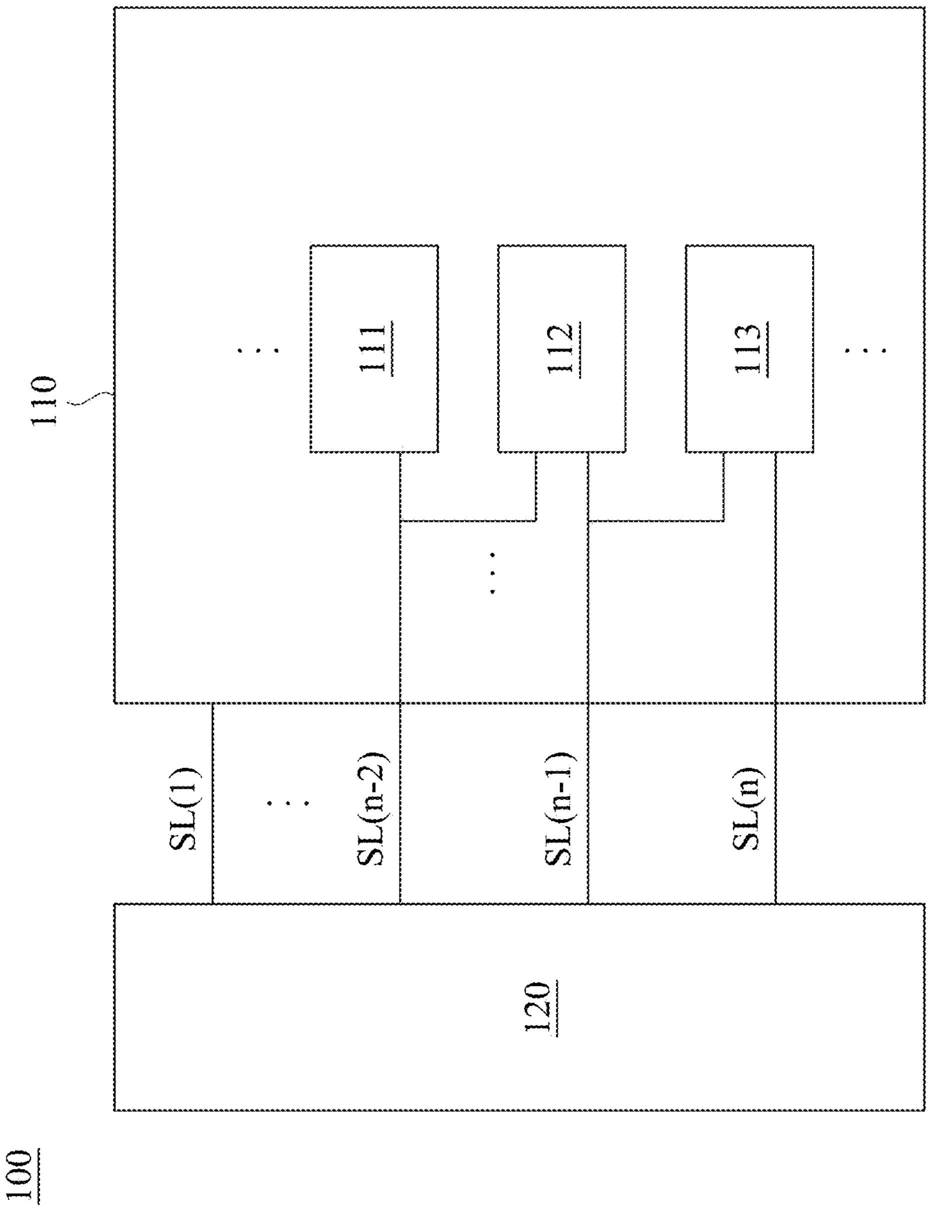
FIG. 1 illustrates a diagram of a display, in accordance with the embodiment of the present disclosure.

FIG. 1 illustrates a diagram of a display 100, in accordance with the embodiment of the present disclosure. Referring to FIG. 1, the display 100 includes a display device 110 and a scan device 120.

In some embodiments, the scan device 120 is configured to provide multiple scan signals to the display device 110 by the scan lines SL(1)-SL($n$−2), SL($n$−1), and SL($n$). As the scan signals S1($n$−1) and S1($n$) shown in FIG. 2, n is the positive integer that greater than 2.

As shown in FIG. 1, the display device 110 includes multiple display circuits, including the display circuits 111-113. In some embodiments, the display circuits 111-113 of the display device 110 perform the light emitting operation based on the signals provided by the scan device 120. For example, the display circuit 112 performs the light emitting operation based on the signals provided by the scan lines SL(*n*−2) and SL(*n*−1), and the display circuit 113 performs the light emitting operation based on the signals provided by the scan lines SL(*n*−1) and SL(*n*).

Figure 2:
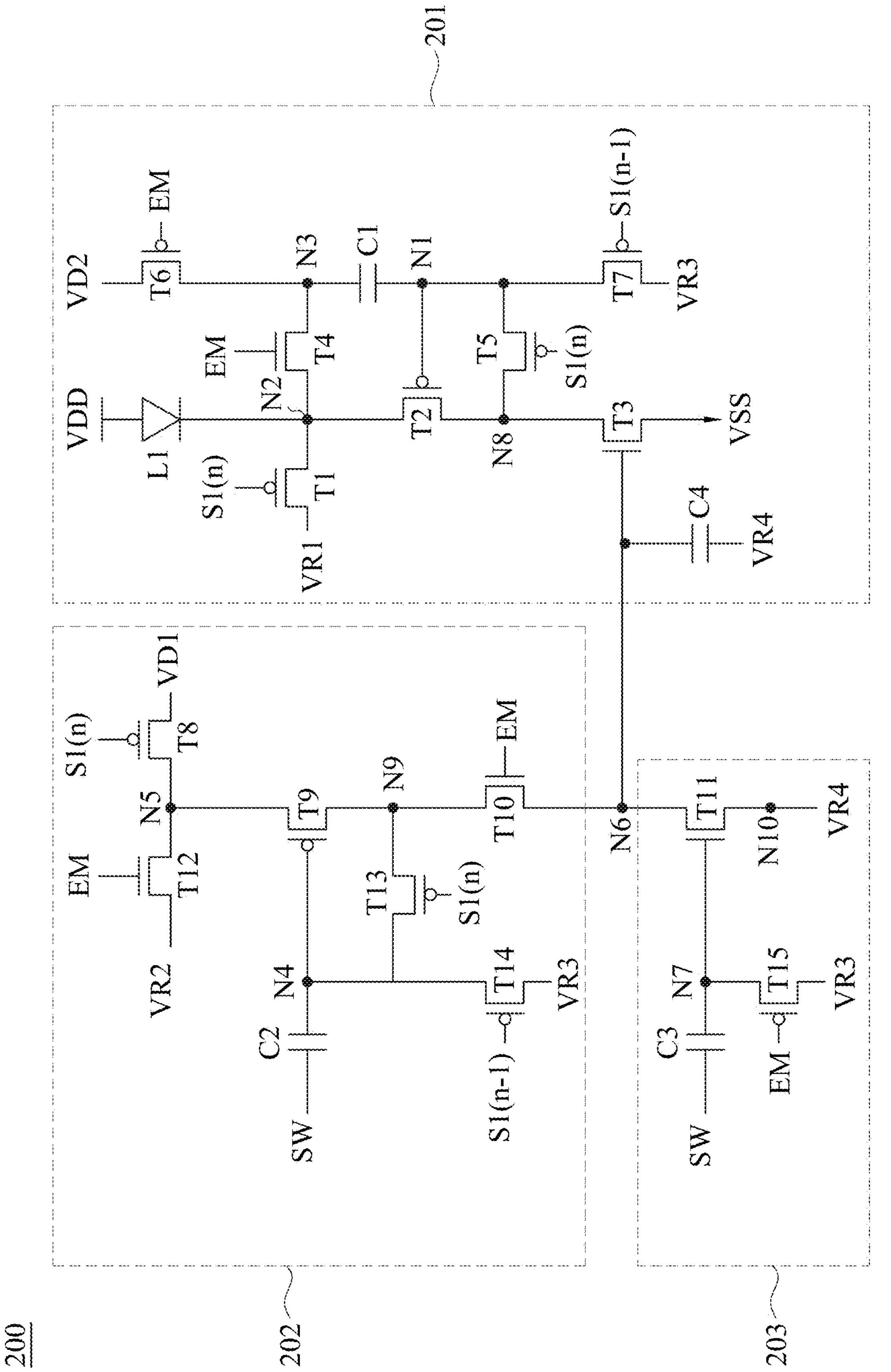
FIG. 2 illustrates a diagram of a display circuit, in accordance with the embodiment of the present disclosure.

FIG. 2 illustrates a diagram of a display circuit 200, in accordance with the embodiment of the present disclosure. The display circuit 200 is one of the embodiments of the display circuit 113 shown in FIG. 1. As shown in FIG. 2, the display circuit 200 includes an emission circuit 201, control circuits 202 and 203.

In some embodiments, the emission circuit 201 is configured to emit light based on the voltage levels of the emission signal EM and the node N6. The control circuit 202 is configured to charge the node N1 based on the emission signal EM and the sweep signal SW. The control circuit 203 is configured to discharge the node N1 based on the emission signal EM and the sweep signal SW.

As shown in FIG. 2, the emission circuit 201 includes switches T1-T7, capacitors C1 and C4, and an emission element L1. One terminal of the switch T1 is configured to receive the reference voltage signal VR1. Another terminal of the switch T1 is coupled to the node N2. The control terminal of the switch T1 is configured to receive the scan signal S1(*n*). One terminal of the switch T2 is coupled to the node N2. Another terminal of the switch T2 is coupled to the node N8. The control terminal of the switch T2 is coupled to the node N1. One terminal of the switch T3 is configured to receive the voltage signal VSS. Another terminal of the switch T3 is configured to the node N8. The control terminal of the switch T3 is coupled to the node N6. One terminal of the switch T4 is coupled to the node N2. Another terminal of the switch T4 is coupled to the node N3. The control terminal of the switch T4 is configured to receive the emission signal EM. One terminal of the switch T5 is coupled to the node N1. Another terminal of the switch T5 is coupled to the node N8. The control terminal of the switch T5 is configured to receive the scan signal S1(*n*). One terminal of the switch T6 is configured to receive the data signal VD2. Another terminal of the switch T6 is configured to the node N3. The control terminal of the switch T6 is configured to receive the emission signal EM. One terminal of the switch T7 is configured to receive the reference voltage signal VR3. Another terminal of the switch T7 is coupled to the node N1. The control terminal of the switch T7 is configured to receive the scan signal S1(*n*−1). One terminal of the capacitor C1 is coupled to the node N1. The other terminal of the capacitor C1 is coupled the node N3. One terminal of the capacitor C4 is coupled to the node N6. The other terminal of the capacitor C4 is configured to receive the reference voltage signal VR4. One terminal of the emission element L1 is configured to receive the voltage signal VDD. The other terminal of the emission element L1 is configured to the node N2. In some embodiments, the capacitor C4 is configured to stabilize the voltage level of the node N6. In some embodiments, the display circuit 200 may not include the capacitor C4.

As shown in FIG. 2, the control circuit 202 includes switches T8-T10, T12-T14, and a capacitor C2. One terminal of the switch T8 is configured to receive the data signal VD1. Another terminal of the switch T8 is coupled to the node N5. The control terminal of the switch T8 is configured to receive the scan signal S1(*n*). One terminal of the switch T9 is coupled to the node N5. Another terminal of the switch T9 is coupled to the node N9. The control terminal of the switch T9 is coupled to the node N4. One terminal of the switch T10 is coupled to the node N9. Another terminal of the switch T10 is coupled to the node N6. The control terminal of the switch T10 is configured to receive the emission signal EM. One terminal of the switch T12 is configured to receive the reference voltage signal VR2. Another terminal of the switch T12 is coupled to the node N5. The control terminal of the switch T12 is configured to receive the emission signal EM. One terminal of the switch T13 is coupled to the node N4. Another terminal of the switch T13 is coupled to the node N9. The control terminal of the switch T13 is configured to receive the scan signal S1(*n*). One terminal of the switch T14 is configured to receive the reference voltage signal VR3. Another terminal of the switch T14 is coupled to the node N4. The control terminal of the switch T14 is configured to receive the scan signal S1(*n*−1). One terminal of the capacitor C2 is coupled to the node N4. The other terminal of the capacitor C2 is configured to receive the sweep signal SW. In some embodiments, the switch T12 is configured to charge the node N6 based on the emission signal EM.

As shown in FIG. 2, the control circuit 203 includes switches T11, T15, and a capacitor C3. One terminal of the switch T11 is coupled to the node N10 to receive the reference voltage signal VR4. Another terminal of the switch T11 is coupled to the node N6. The control terminal of the switch T11 is coupled to the node N7. One terminal of the switch T15 is configured to receive the reference voltage signal VR3. Another terminal of the switch T15 is coupled to the node N7. The control terminal of the switch T15 is configured to the emission signal EM. One terminal of the capacitor C3 is coupled to the node N7. The other terminal of the capacitor C3 is configured to receive the sweep signal SW.

In different embodiments, the switches T1-T15 can be P-channel metal-oxide semiconductors (PMOS), N-channel metal-oxide semiconductors (NMOS), thin-film transistors (TFT), or the other components of the switches of the different types. For example, the switches T1, T2, T5-T9, and T13-T15 are the TFTs of the PMOSs, and the switches T3, T4, and T10-T12 are the TFTs of the NMOSs.

In some embodiments, the reference voltage signal VR1 has the voltage level VL1. The reference voltage signal VR2 has the voltage level VL2. The reference voltage signal VR3 has the voltage level VL3. The reference voltage signal VR4 has the voltage level VL4. The data signal VD1 has the voltage level VL5. The data signal VD2 has the voltage level VL6. The voltage signal VDD has the voltage level VL7. The voltage signal VSS has the voltage level VL8. In some embodiments, the data signal VD1 decides the time of the emitting light of the emission element L1, and the data signal VD2 decides the value of the current flowing through the emission element L1.

In some embodiments, the voltage level VL6 is greater than the voltage level VL1. The voltage level VL1 is greater than the voltage level VL7. The voltage level VL7 is greater than the voltage level VL2. Each of the voltage levels VL2 and VL5 is greater than the voltage level VL8. The voltage level VL8 is greater than the voltage level VL3. The voltage level VL3 is greater than the voltage level VL4. For example, the voltage level VL6 is within the voltage range of 13 to 14 volts. The voltage level VL1 is within the voltage range of 9.5 to 10 volts. The voltage level VL7 is about 9 volts. The voltage level VL2 is about 6 volts. The voltage level VL5 is within the voltage range of 5 to 15 volts or 7 to 15 volts. the voltage level VL8 is about 0 volt. The voltage level VL3 is about −1 volt. The voltage level VL4 is about −4 volts.

In some embodiments, the voltage level VL4 is the disable voltage level of the switch T3, and the voltage level VL2 is the enable voltage level of the switch T3. In other words, the switch T3 is turned off based on the voltage level VL4 and is turned on based on the voltage level VL2. In some embodiments, the capacitance of the capacitor C2 is equal to the capacitance of the capacitor C3.

As shown in FIG. 1 and FIG. 2, in some embodiments, the scan line SL(*n*−1) is configured to provide the scan signal S1(*n*−1) to the display circuit 113, and the scan line SL(*n*) is configured to provide the scan signal S1(*n*) to the display circuit 113.

In some embodiments, the emission circuit 201 corresponds to a pulse amplitude modulation (PAM) circuit. The control circuit 202 corresponds to a pulse width modulation (PWM) circuit. The emission element L1 is a light emitting diode, e.g., a micro LED (μLED).

Figure 3:
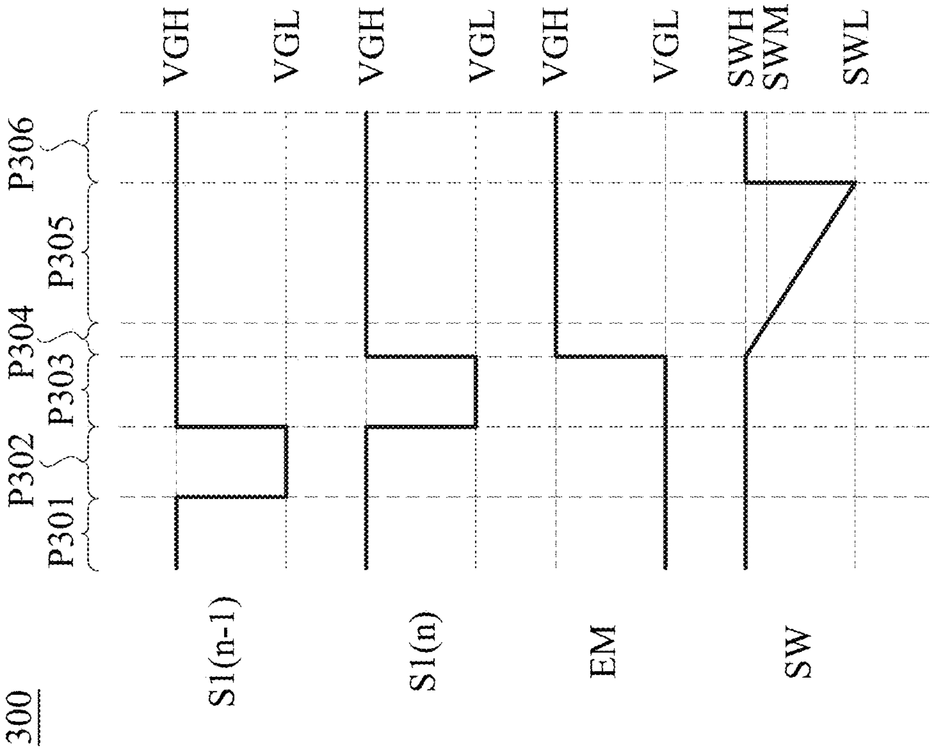
FIG. 3 illustrates a timing diagram of operations of the display circuit illustrated in FIG. 2, in accordance with the embodiment of the present disclosure.

FIG. 3 illustrates a diagram of the timing diagram 300 of the operation of the display circuit 200 in FIG. 2, in accordance with the embodiment of the present disclosure. As shown in FIG. 3, the timing diagram 300 includes the periods P301-P306 in that order. In some embodiments, the timing diagram 300 corresponds to the operations of the different signals shown in FIG. 2, e.g., the operations of the scan signal S1(*n*), the scan signal S1(*n*−1), the emission signal EM, and the sweep signal SW.

In the periods P301-P306, each of the scan signals S1(*n*), S1(*n*−1), and the emission signal EM operates between the voltage levels VGH and VGL. The sweep signal SW operates between the voltage levels SWH, SWM, and SWL, in which the voltage level SWM is between the voltage levels SWH and SWL. In some embodiments, the absolute value of the potential difference between the voltage levels VGH and VG is 20 volts. The absolute value of the potential difference between the voltage levels SWH and SWL is 10 volts. For example, the voltage level VGH is 15 volts. The voltage level VGL is −5 volts. The voltage level SWH is 15 volts. The voltage level SWL is 5 volts.

In some embodiments, the voltage level VGH is the disable voltage levels of the switches T1, T2, T5-T9, and T13-T15, and the voltage level VGL is the enable voltage levels of the switches T1, T2, T5-T9, and T13-T15. The voltage level VGH is the enable voltage levels of the switches T3, T4, and T10-T12, and the voltage level VGL is the disable voltage levels of the switches T3, T4, and T10-T12. In other words, the switches T1, T2, T5-T9, and T13-T15 are turned off based on the voltage level VGH and are turned on based on the voltage level VGL. The switches T3, T4, and T10-T12 are turned off based on the voltage level VGL and are turned on based on the voltage level VGH.

In the periods P301-P303, the emission signal EM has the voltage level VGL that turns off the switched T4, T10, and T12 and turns on the switches T6 and T15. Meanwhile, the switch T6 provides the data signal VD2 to the node N3 to adjust the voltage level of the node N3 to the voltage level VL6. The switch T15 provides the reference voltage signal VR3 to the node N7 to reset the voltage level of the node N7 to the voltage level VL3. The voltage level of the node N7 is higher than the voltage level of the node N10, and the absolute value of the potential difference between the voltage level of the node N7 and the voltage level of the node N10 is greater than $|V_{TH\_11}|$, which makes the switch T11 be turned on to provide the reference voltage signal VR4 to the node N6 and discharges the voltage level of the node N6 to the voltage level VL4. Correspondingly, the switch T3 is turned off, which makes the emission element L1 not emit light. The threshold voltage level $V_{TH\_11}$ is the threshold voltage level of the switch T11.

In the period P301, the scan signals S1(*n*−1) and S1(*n*) have the voltage level VGH that turns off the switches T7, T14, T1, T5, T8, and T13. Meanwhile, the capacitor C1 adjusts the voltage level of the node N1 to the voltage level (VL1−$|V_{TH\_2}|$) by the capacitive coupling. The threshold voltage level $V_{TH\_2}$ is the threshold voltage level of the switch T2. The sweep signal SW has the voltage level VGH that makes the capacitor C2 adjust the voltage level of the node N4 to the voltage level (VL5−$|V_{TH\_9}|$) by the capacitive coupling to turn off the switch T9. The threshold voltage level $V_{TH\_9}$ is the threshold voltage level of the switch T9. In some embodiments, the period P301 is called the turned off (OFF) stage.

In the period P302, the scan signal S1(*n*−1) has the voltage level VGL that turns on the switches T7 and T14. Meanwhile, the switches T7 and T14 respectively provide the reference voltage signal VR3 to the nodes N1 and N4 to reset the voltage levels of the nodes N1 and N4 to the voltage level VL3. Correspondingly, the switches T2 and T9 are turned on. In some embodiments, the period P302 is called the reset stage. In summary, the display circuit 200 resets the voltage level of the control terminals of the switches T2 and T9 by the switches T7 and T14.

In the period P303, the scan signal S1(*n*−1) has the voltage level VGH that turns off the switches T7 and T14. The scan signal S1(*n*) has the voltage level VGL that turns on the switches T1, T5, T8, and T13. Meanwhile, the switch T1 provides the reference voltage signal VR1 to the node N2 to adjust the voltage level of the node N2 to the voltage level VL1. The switches T2 and T5 provide the voltage level of the node N2 to the node N1 to make the switch T2 be connected in the diode form through the switch T5. Correspondingly, the voltage level of the node N1 is adjusted to the voltage level (VL1−$|V_{TH\_2}|$). Similarly, the switch T8 provides the data signal VD1 to the node N5 to adjust the voltage level of the node N5 to the voltage level VL5. The switches T9 and T13 provide the voltage level of the node N5 to the node N4 to make the switch T9 be connected in the diode form through the switch T13. Correspondingly, the voltage level of the node N4 is adjusted to the voltage level (VL5−$|V_{TH\_9}|$). In some embodiments, the period P303 is called the compensation and data input stage. In summary, the display circuit 200 compensates the threshold voltage variation of the switch T2 by the switches T1 and T5 and compensates the threshold voltage variation of the switch T9 by the switches T8 and T13.

In the period P304, the scan signal S1(*n*) has the voltage level VGH that turns off the switches T1, T5, T8, and T13. The emission signal EM has the voltage level VGH that turns off the switches T6 and T15 and turns on the switches T4, T10, and T12. Meanwhile, the switch T4 provides the voltage level of the node N3 to the node N2 to adjust the voltage level of the node N2 to the voltage level VL6. The switch T12 provides the reference voltage signal VR2 to the node N5 to adjust the voltage level of the node N5 to the voltage level VL2. The sweep signal SW is gradually pulled from the voltage level SWH to the voltage level SWM. Correspondingly, the capacitor C2 adjusts the voltage level of the node N4 to the voltage level (VL5−$|V_{TH\_9}|$−$|\Delta V|$) by the capacitive coupling, in which the potential difference $\Delta V$ corresponds to the potential difference of the voltage levels SWH and SWM. The absolute value of the potential difference between the voltage level of the node N5 and the voltage level of the node N4 is less than $|V_{TH\_9}|$. Correspondingly, the switch T9 still keeps being turned off. The capacitor C3 adjusts the voltage level of the node N7 to the voltage level (VL3−$|\Delta V|$) by the capacitive coupling. The absolute value of the potential difference between the voltage level of the node N7 and the voltage level of the node N10 is less than $|V_{TH\_11}|$. Correspondingly, the switch T11 is turned off.

In the period P305, the sweep signal SW is gradually pulled from the voltage level SWM to the voltage level SWL. Meanwhile, the capacitor C2 adjusts the voltage level of the node N4 by the capacitive coupling, which makes the absolute value of the potential difference between the voltage level of the node N5 and the voltage level of the node N4 be greater than $|V_{TH\_9}|$ to turn on the switch T9. The switches T9 and T10 provide the voltage level of the node N5 to the node N6 to charge the voltage level of the node N6 to the voltage level VL2. Correspondingly, the switch T3 is turned on, which makes the emission element L1 start to emit light. Meanwhile, the switch T11 still keeps being turned off. In some embodiments, the periods P304 and P305 are called the emission stage. In summary, the display circuit 200 charges the node N6 by the switches T12, T9, and T10 to turn on the switch T3 to make the emission element L1 emit light.

In the period P306, the sweep signal SW has the voltage level SWH. Meanwhile, the capacitor C2 adjusts the voltage level of the node N4 to the voltage level (VL5−$|V_{TH\_9}|$) by the capacitive coupling, which makes the switch T9 be turned off, and the capacitor C3 adjusts the voltage level of the node N7 to the voltage level VL3 by the capacitive coupling, which makes the switch T11 be turned on to discharge the voltage level of the node N6 to the voltage level VL4. Correspondingly, the switch T3 is turned off to make the emission element L1 stop emitting light. In some embodiments, the period P306 is called the stable stage.

In some embodiments, after the period P306, the display circuit 200 repeats the operations of the periods P304-P306, e.g., repeating the operations of the periods P304-P306 10 times, then performing the operations of the periods P304-P305, and then performing the operation of the period P301 to complete the frame of the light emitting operation.

In some embodiments, the duration of the period P302 is the same as the duration of each of the periods P303 and P306. The sum of the durations of the periods P304 and P305 is twice as long as the duration of the period P302.

Figure 4:
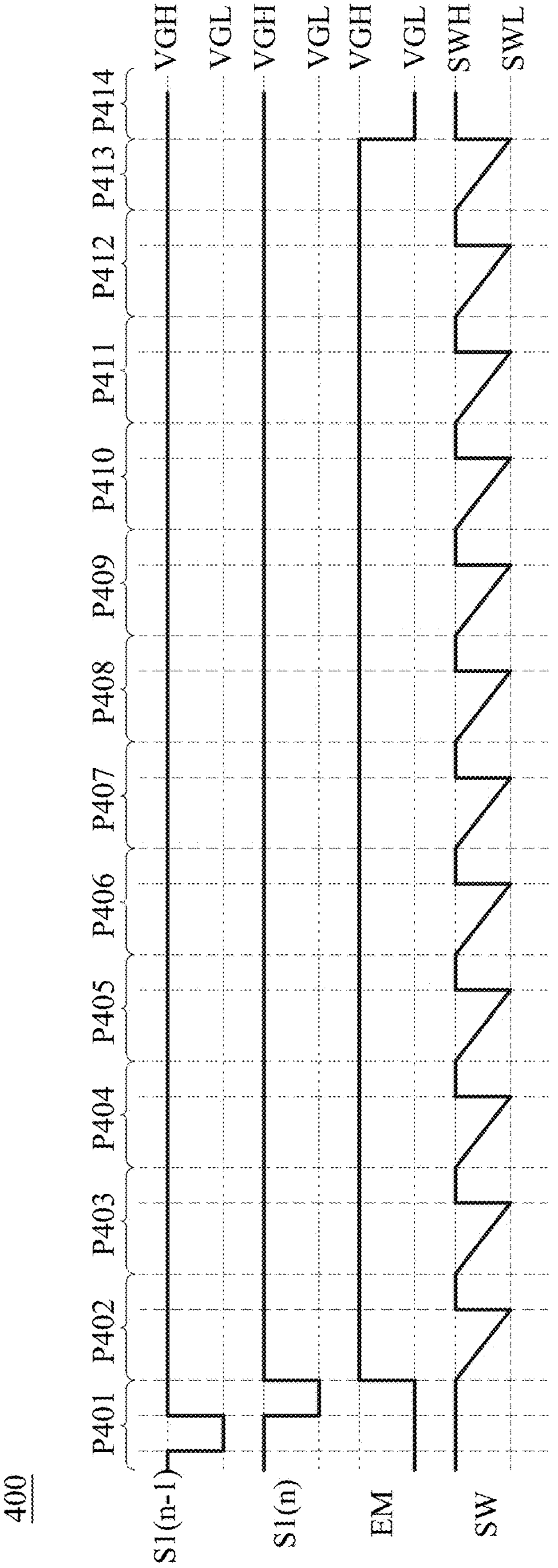
FIG. 4 illustrates a timing diagram of operations of the display circuit illustrated in FIG. 2, in accordance with the embodiment of the present disclosure.

FIG. 4 illustrates a diagram of the timing diagram 400 of the operations of the display circuit 200 in FIG. 2, in accordance with the embodiment of the present disclosure. As shown in FIG. 4, the timing diagram 400 includes the periods P401-P414 in that order. In some embodiments, the timing diagram 400 corresponds to the operations of the different signals shown in FIG. 2, e.g., the operations of the scan signal S1(*n*), the scan signal S1(*n*−1), the emission signal EM, and the sweep signal SW.

Referring to FIG. 4 and FIG. 3, the timing diagram 300 corresponds to part of the period of the timing diagram 400. For example, the operation of the period P401 is similar to the operations of the periods P301-P303. The operation of each of the periods P402-P412 is similar to the operations of the periods P304-P306. The operation of the period P413 is similar to the periods P304 and P305. The operation of the period P414 is similar to the operation of the period P301. Therefore, the part of the description will not be repeated.

In some embodiments, the periods P401-P414 are called one frame. Referring to FIG. 4 and FIG. 2, the display circuit 200 performs the operations of the periods P401-P414 to complete the frame of the light emitting operation.

In some practices, the display device adopts the structure of the multi-emission to perform the light emission and the grey scale modulation, and the display device solves the problem of the threshold voltage variation of the TFT and the problem of the power voltage drop by self-compensating to achieve the high uniform brightness. However, the display device has the multiple TFTs on the path of the light emitting current. To ensure that the driving TFTs can be operated in the saturated region during the light emitting stage and to take into account the drain-source voltage of the TFTs, the required power voltage increases, which leads to the increase in the power consumption of the display device. In addition, longer current rise and/or fall times reduce the accuracy of gray scale controlling, especially at the low gray scale, which results in distorted current waveforms that cannot be maintained at the high light emitting efficiency point.

Compared to the practices above, in some embodiments of the present disclosure, the control circuit 203 and the control circuit 202 share the sweep signal SW. Furthermore, the current path of the emission element L1 of the emission circuit 201 only passes through the switches T2 and T3, which reduces the cross voltage between the voltage signal VDD and the voltage signal VSS. Thus, signals required to be used by the display circuit 200 are reduced, the signal routing is saved, the area required for the peripheral circuits of the display 100 decreases, uniform brightness is improved, current error rate is reduced, the consistency of the light emitting current is increased, power consumption is reduced, the rise time of the current waveform is reduced, and precision of gray scale controlling is improved.

Although the present invention has been described above by the embodiments, it is not intended to limit the contents of the present disclosure. People having ordinary skill in the art may make some modifications and variations without departing from the scope or spirit of the invention. Thus, the scope of protection of the present disclosure shall be defined as the following claims.

What is claimed is:

1. A display device, comprising:
an emission circuit coupled to a first node and configured to emit light based on voltage levels of an emission signal and the first node;
a first control circuit configured to charge the first node based on a sweep signal and the emission signal; and
a second control circuit configured to discharge the first node based on the sweep signal and the emission signal.

2. The display device of claim 1, wherein
the second control circuit is configured to discharge the first node based on a first reference voltage signal and a second reference voltage signal, and
a voltage level of the second reference voltage signal is greater than a voltage level of the first reference voltage signal.

3. The display device of claim 2, wherein
the first control circuit is configured to modify the voltage level of the first node based on a third reference voltage signal and the second reference voltage signal, and
a voltage level of the third reference voltage signal is greater than the voltage level of the second reference voltage signal.

4. The display device of claim 1, wherein
the second control circuit is configured to discharge the first node based on a first reference voltage signal and a second reference voltage signal, and
a voltage level of the second reference voltage signal is greater than a voltage level of the first reference voltage signal;

wherein the first control circuit is configured to modify the voltage level of the first node based on a third reference voltage signal and the second reference voltage signal, and a voltage level of the third reference voltage signal is greater than the voltage level of the second reference voltage signal.

5. The display device of claim 1, wherein the second control circuit comprises:

a first switch, wherein a first terminal of the first switch is coupled to the first node;

a first capacitor, wherein a first terminal of the first capacitor is coupled to a control terminal of the first switch, and a second terminal of the first capacitor is configured to receive the sweep signal; and a second switch, wherein a first terminal of the second switch is coupled to the control terminal of the first switch, and a control terminal of the second switch is configured to receive the emission signal.

6. The display device of claim 5, wherein the first switch is turned on when the sweep signal has a first voltage level, and each of the first switch and the second switch is turned off when the sweep signal has a second voltage level different from the first voltage level.

7. The display device of claim 1, wherein the second control circuit comprises:

a first switch, wherein a first terminal of the first switch is coupled to the first node;

a first capacitor, wherein a first terminal of the first capacitor is coupled to a control terminal of the first switch, and a second terminal of the first capacitor is configured to receive the sweep signal; and a second switch, wherein a first terminal of the second switch is coupled to the control terminal of the first switch, and a control terminal of the second switch is configured to receive the emission signal;

wherein the first switch is turned on when the sweep signal has a first voltage level, and each of the first switch and the second switch is turned off when the sweep signal has a second voltage level different from the first voltage level.

8. A display device, comprising:

an emission circuit configured to emit light based on a voltage level of a first node;

a first switch, wherein a first terminal of the first switch is coupled to the first node;

a first capacitor, wherein a first terminal of the first capacitor is coupled to a control terminal of the first switch, and a second terminal of the first capacitor is configured to receive a sweep signal;

a second switch, wherein a first terminal of the second switch is coupled to the first node;

a third switch, wherein a first terminal of the third switch is coupled to a second terminal of the second switch; and a second capacitor, wherein a first terminal of the second capacitor is coupled to a control terminal of the third switch and a second terminal of the second capacitor is configured to receive the sweep signal.

9. The display device of claim 8, further comprising:

a fourth switch, wherein a first terminal of the fourth switch is coupled to the control terminal of the first switch, and a control terminal of the fourth switch is configured to an emission signal.

10. The display device of claim 8, further comprising:

a fourth switch, wherein a first terminal of the fourth switch is coupled to the control terminal of the first switch, and a control terminal of the fourth switch is configured to an emission signal, wherein the emission circuit is configured to emit light based on the emission signal, and the control terminal of the second switch is configured to receive the emission signal.

11. The display device of claim 10, wherein a second terminal of the first switch is configured to receive a first reference voltage signal; and a second terminal of the fourth switch is configured to receive a second reference voltage signal, wherein a voltage level of the second reference voltage signal is greater than a voltage level of the first reference voltage signal.

12. The display device of claim 8, further comprising:

a fourth switch, wherein a first terminal of the fourth switch is coupled to the control terminal of the first switch, and a control terminal of the fourth switch is configured to an emission signal, wherein the emission circuit is configured to emit light based on the emission signal, and the control terminal of the second switch is configured to receive the emission signal;

wherein a second terminal of the first switch is configured to receive a first reference voltage signal, and a second terminal of the fourth switch is configured to receive a second reference voltage signal, wherein a voltage level of the second reference voltage signal is greater than a voltage level of the first reference voltage signal.

13. The display device of claim 8, wherein the first switch is turned on when the sweep signal has a first voltage level, and each of the first switch and the third switch is turned off when the sweep signal has a second voltage level different from the first voltage level.

14. The display device of claim 13, wherein each of the second switch and the third switch is turned on and the first switch is turned off when the sweep signal has a third voltage level, and the second voltage level is between the first voltage level and the third voltage level.

15. The display device of claim 8, wherein the first switch is turned on when the sweep signal has a first voltage level;

each of the first switch and the third switch is turned off when the sweep signal has a second voltage level different from the first voltage level;

each of the second switch and the third switch is turned on and the first switch is turned off when the sweep signal has a third voltage level; and the second voltage level is between the first voltage level and the third voltage level.

* * * * *